United States Patent [19]

Drexler

[11] Patent Number: 4,835,376

[45] Date of Patent: * May 30, 1989

[54] LASER READ/WRITE SYSTEM FOR PERSONAL INFORMATION CARD

[75] Inventor: Jerome Drexler, Los Altos Hills, Calif.

[73] Assignee: Drexler Technology Corporation, Mountain View, Calif.

[ * ] Notice: The portion of the term of this patent subsequent to Oct. 1, 2002 has been disclaimed.

[21] Appl. No.: 52,633

[22] Filed: May 19, 1987

Related U.S. Application Data

[60] Division of Ser. No. 693,856, Jan. 22, 1985, Pat. No. 4,692,394, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, which is a continuation-in-part of Ser. No. 238,833, Feb. 27, 1981, abandoned.

[51] Int. Cl.[4] .......................... G06K 1/00; G06K 1/12
[52] U.S. Cl. .................................... 235/488; 235/454; 235/487; 283/900; 283/904; 346/76 L
[58] Field of Search ............... 235/454, 488, 487, 479, 235/380, 494; 283/904, 900, 54, 57, 112, 94, 77, 78; 346/76 L; 369/32; 902/25

[56] References Cited

U.S. PATENT DOCUMENTS

| | | | |
|---|---|---|---|
| 3,412,493 | 11/1968 | French | 283/78 |
| 3,601,913 | 8/1971 | Pollock | 283/112 |
| 3,921,318 | 11/1975 | Calavetta | 283/900 |
| 3,921,969 | 11/1975 | Hickey et al. | 235/479 |
| 4,151,667 | 5/1979 | Idelson et al. | 40/2.2 |
| 4,213,038 | 7/1980 | Silverman et al. | 234/382 |
| 4,230,939 | 10/1980 | de Bont et al. | 235/488 |
| 4,236,332 | 12/1980 | Domo | 40/2.2 |
| 4,278,756 | 7/1981 | Bouldin et al. | 430/414 |
| 4,312,938 | 1/1982 | Drexler et al. | 430/496 |
| 4,316,073 | 2/1982 | Lemelson | 346/76 L |
| 4,343,879 | 8/1982 | Drexler et al. | 430/14 |
| 4,398,223 | 8/1983 | Lemelson | 369/32 |
| 4,544,181 | 10/1985 | Maurer et al. | 283/904 |
| 4,544,835 | 10/1985 | Drexler | 283/904 |
| 4,745,268 | 5/1988 | Drexler | 235/454 |

Primary Examiner—Alan Faber
Assistant Examiner—Robert A. Weinhardt
Attorney, Agent, or Firm—Thomas Schneck

[57] ABSTRACT

A read and write system for personal information cards employing a laser. Personal information is recorded on an information medium containing both visual images, such as a face image or fingerprint, and laser recorded data. The visual images are created on a piece of photographic material or eye readable laser recording material. The visual image material is adhered to a surface of a wallet-size card. A strip of laser recordable optical data storage material is also adhered to the card. After the strip is put on the card, a laser records personal information indicia on the strip in situ. The strip may be a reflective material of silver particles in a gelatin matrix, in which recording produces spots having a detectable difference in reflectivity. The card may be coated with a transparent protective laminate material. A laser reader and writer may be used in conjunction with the card and a device for moving the card relative to a laser beam for reading or writing information on the card. The visual images and laser recorded data may be related to a person.

11 Claims, 2 Drawing Sheets

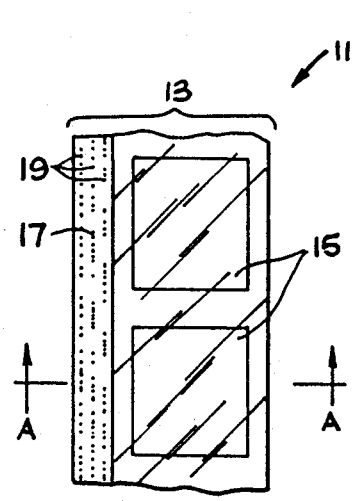
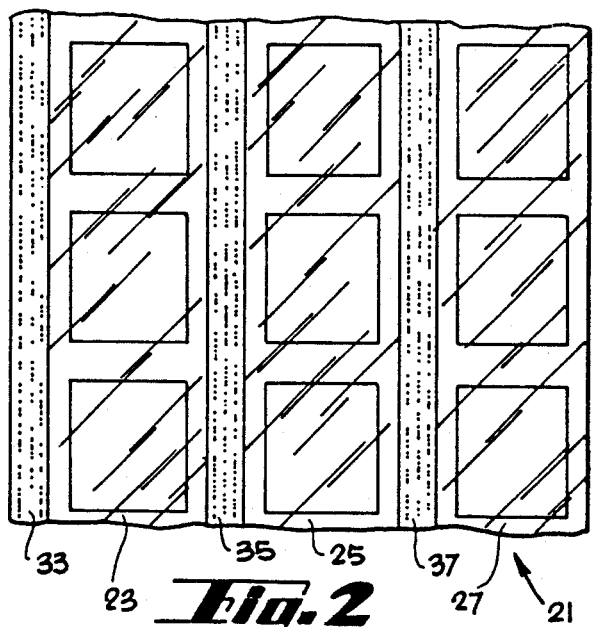
Fig. 1
Fig. 2
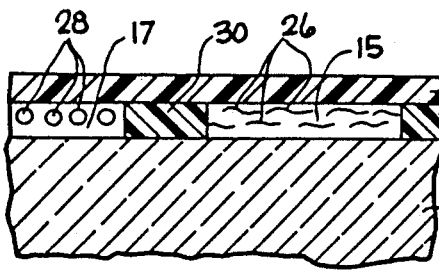
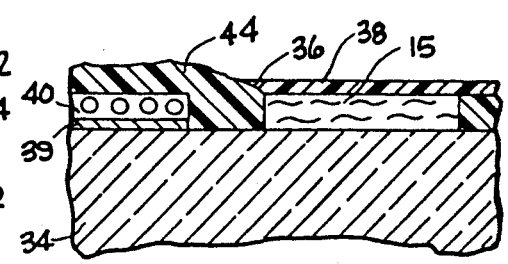
Fig. 3
Fig. 4
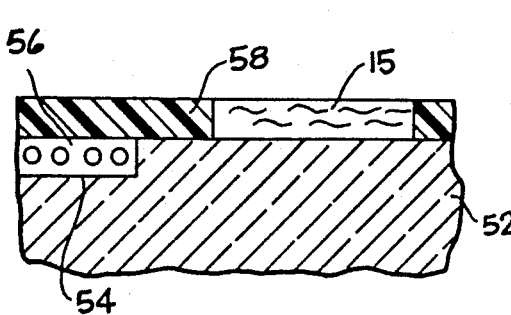
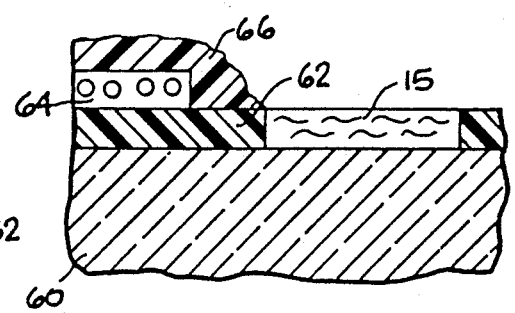
Fig. 5
Fig. 6

LASER READ/WRITE SYSTEM FOR PERSONAL INFORMATION CARD

CROSS REFERENCES TO RELATED APPLICATIONS

This is a divisional of co-pending application Ser. No. 693,856 filed on Jan. 22, 1985, now U.S. Pat. No. 4,692,394 which is a continuation-in-part of patent application Ser. No. 443,596 filed Nov. 22, 1982, now U.S. Pat. No. 4,503,135, which is a continuation-in-part of patent application Ser. No. 238,832 filed Feb. 27, 1981, now U.S. Pat. No. 4,360,728, granted Nov. 23, 1982 and patent application Ser. No. 238,833 filed Feb. 27, 1981 now abandoned.

TECHNICAL FIELD

The invention relates to optical data information storage and more particularly to a system for recording personal information on an information medium containing both eye visible images and laser recorded machine readable data.

BACKGROUND ART

Identification cards have used magnetic data strips in conjunction with photographic prints of the card owner. In U.S. Pat. No. 4,360,728, Drexler discloses a bank card for automatic teller machines bearing both a strip of magnetic recording material and a direct-read-after-write reflective laser recording material.

In U.S. Pat. No. 4,236,332, Domo discloses a medical record card containing a microfilm portion having some data visible to the eye and other data visible by magnification. the directly visible data is alphanumeric character codes pertaining to emergency medical conditions of the patient and the magnifiable data portions detail the medical history.

Silverman et al. teach in U.S. Pat. No. 4,213,038 an access control system with an identification card. The card has machine recordable indicia used to choose a master microspot pattern from the machine's memory. This master pattern is compared with an identical pattern on the card for verification. the card also has space for a picture and a signature. Similarly, Idelson et al. (U.S. Pat. No. 4,151,667) teach an identification card having a photograph and a phosphorescent bar code patterns used for verification. The amount of information these cards can hold is extremely limited. Random microspot patterns can only be used for verification, while bar codes can only represent a small amount of specific data.

An object of the invention is to provide a system of recording personal information on a card, both a visual image and data to accompany the image either prior to, during, or after exposure forming such image.

DISCLOSURE OF THE INVENTION

The above object has been met with a card having visually readable information on a piece of laser recordable material or on photographic material and a strip of laser recordable material, recorded in situ, both disposed on a wallet-size card. The visually readable information, which is adhered to an inner or outer surface of the card, relates to a person, and may consist of a face image or a fingerprint. A laser beam records data on the strip of optical storage material, in situ, either by ablation, melting, physical or chemical change, thereby forming spots representing changes in reflectivity. The recording process produces differences in reflectivity detectable by a light detector. The recording may be done either before or after the strip is ahdered to the card. In this manner data concerning the person may be recorded and read directly from the strip. No processing after laser recording is required when the recording strip is a direct-read-after-write material. Laser recording materials also may be used that require heat processing after laser recording.

The uniform surface reflectivity of this reflective strip before recording typically would range between 8% and 65%. For a highly reflective strip the average reflectivity over a laser recorded spot might be in the range of 5% to 25%. Thus, the reflective contrast ratio of the recorded spots would range between 2:1 and 7:1. Laser recording materials are known in the art that create either low reflectivity spots in a reflective field or high reflective spots in a low reflectivity field. An example of the latter type is described in U.S. Pat. No. 4,343,879. When the reflectivity of the field is in the range of 8% to 20% the reflective spots have a reflectivity of about 40%. The reflective contrast ratio would range from 2:1 to 5:1. Photographic pre-formatting would create spots having a 10% reflectivity in a reflective field or 40% in a low reflectivity field.

By means of an in situ laser recording, transaction data, information, or the like related to the photographic image is recorded at subsequent times. For example, insurance claims or medical record entries may be processed sequentially, recording various transactions on the strip one after another, without erasing data. Digital voice recordings or signatures could also be recorded. A photograph of the claimant would protect against fraudulent use of the card.

BRIEF DESCRIPTION OF THE DRAWINGS

FIG. 1 is a top view of a first embodiment of the recording medium of the present invention.

FIG. 2 is a top view of the second embodiment of the present invention.

FIGS. 3–6 are alternate sectional constructions of the medium of FIG. 1 taken along lines A—A in FIG. 1.

BEST MODE FOR CARRYING OUT THE INVENTION

Figure 7:
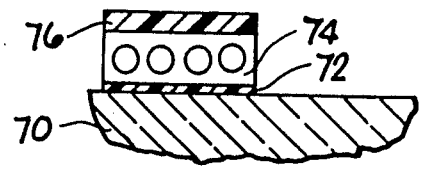
FIG. 7 is a partial sectional view of an alternate embodiment of the medium of FIG. 1.

With reference to FIG. 1, the data medium used in the present invention may be seen to comprise a photographic medium 11 having a planar major surface 13 which is divided into a visual image area 15 and a data strip 17. Visual image medium 11 is in sheet form. The visual image area 15 can be conventional photographic images, produced by usual photographic techniques, typically by exposure and development of the medium. Alternatively a laser can be used to create eye readable visual images. The image areas 15 may occupy the entirety of the visual image medium, except for the data strip, or discrete areas as shown in FIG. 1. Several images may be disposed on the photographic medium. Alternatively, only a single image may be on the medium.

The present invention uses an optical data strip 17 which may be a direct read-after-write (DRAW) material which may have prerecorded information, but must have user-written information, written on the strip in-situ. The type of DRAW material that may be used is relatively highly reflective material which forms a shiny field against low reflectivity spots such as pits, craters, holes or dark spots in the reflective surface which tend to be absorptive of light energy. The contrast differences between the low reflectivity spots and the shiny reflective field surrounding the spots cause variations at a detector when the spots are illuminated by light of lesser intensity than the light that originally created the spots. Alternatively a low reflectivity material may be used which creates high reflectivity spots when recorded with a laser.

Data strip 17 is intended to provide a personal data record accompanying the visual images on the same material just as a movie sound track accompanies a sequence of frames of film. Data is written in individual tracks extending in a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the spot pattern is approximately 5 microns in diameter with a spacing of about 5–10 microns between spots. The spots may be either digital or analog data, but in either case are recorded by a laser in the usual way, for example as shown in U.S. Pat. No. 4,278,756 to Bouldin, et al.

FIG. 2 is similar to FIG. 1 except that a larger visual image medium 21 is used with a plurality of rows of images 23, 25 and 27. Accompanying each row of images is a corresponding data strip 33, 35 and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips are not usually read with the naked eye, but require either microscopic inspection or preferably reading by reflection of a scanning laser beam as explained below. However, a laser could record visual images such as serial numbers, personal data, or even face images on the laser recordable material.

FIG. 3 illustrates a first construction of the recording medium shown in FIG. 1. The sectional view includes a substrate 22 which is transparent and may be one of the many polymeric substrate materials known in photographic arts. Applied to the substrate 22 is a subbing layer, not shown, and an emulsion layer 24. This emulsion layer has a photographic image area 15 made by exposure and development in the usual way. The wavy lines 26 represent filamentary black silver particles which characterize normal photographic black and clear images. Data strip 17 is one of many laser recording materials. For example it could be made from silver-halide emulsion having fine grain size, less than 0.1 microns, by a silver diffusion transfer process described in U.S. Pat. No. 4,312,938 (Drexler and Bouldin), incorporated by reference herein.

In the referenced patented process, silver-halide emulsion is exposed to a non-saturating level of actinic radiation to activate silver halide. The activated emulsion is then photographically developed to a gray color of an optical density of 0.05–2.0 to red light, forming an absorptive underlayer. There is no fixing after this first development step. The surface of the emulsion strip is then fogged by a fogging agent such as borohydride to produce silver precipitating nuclei from the part of the unexposed and undeveloped silver-halide emulsion. The strip is then contacted with a monobath containing a silver-halide solvent and a silver reducing agent to complex, transfer and reduce the remaining unexposed and undeveloped silver to reflective non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Separating the data strip from the image area is an unprocessed silver-halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in photolithography. However, in the present case it may be necessary to proceed in two steps. In the first step, conventional photographic processing of image area 26 takes place. Subsequently, the image area, together with the buffer area 30 is masked to allow separate processing of the data strip 28. After processing is complete, a transparent layer 32 is applied to the emulsion, forming a protective layer. Layer 32 may be any of the well known protective coatings, including a layer of clear gelatin. The remainder of the film, apart from the data strip 17, need not have fine grain size. Data strip 17 can also be added to the photographic material in the form of an adhesive tape which is bonded to the photographic material either before or after the photograph is developed, or both can be bonded separately to a wallet-size card.

FIG. 4 is similar to FIG. 3 except that substrate 34 is coated only with silver-halide emulsion to the right of line 36. The image area 15 is exposed, developed and fixed. A protective coating 38 may then be applied. A preformed strip 40 of laser recording material may then be disposed on the substrate. This may be a strip of Drexon material. Drexon is a trademark of Drexler Technology Corporation for reflective silver based laser recording material, such as that described in the aforementioned U.S. Pat. No. 4,312,938. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to De Bont, et al. where the patent teaches a thin metallic recording layer of reflective metal such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. These materials may be deposited directly on substrate 34, as by sputtering, or may be premanufactured on a very thin substrate and adhered to the substrate by means of a subbing layer. After adhering the laser recording material to the substrate, a transparent protective coating 44 is applied. This coating material may be the same as protective material 38.

With reference to FIG. 5, substrate 52 has a notch or groove 54 which allows placement of a laser recording material 56 therein. This laser recording material may be processed in situ from silver-halide material previously existing in the groove, as in the case of FIG. 3, or preexisting laser recording material which is placed in the groove, as with the preexisting laser recording material of FIG. 4. In either case, the photographic image area 15 is exposed and developed in the usual way, while an unexposed and undeveloped area 58 protects data strip 56. Since emulsion area 58 is unexposed and undeveloped, it remains clear and forms a protective layer over the data strip.

In the embodiment of FIG. 6, no groove exists in substrate 60. Rather, a photographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver-halide emulsion strip which is then processed, as data strip 17 in FIG. 3 is processed, or may be a preformed strip which is applied as in FIG. 4. The strip is then covered with a protective coating 66.

With reference to FIG. 7, a substrate 70 is shown which carries a photographic image in a substrate portion not shown. This image may be above the substrate surface or within a groove of the substrate, as previously mentioned. The substrate carries a secondary substrate 72 which is a thin flexible material, only a few mils thick carrying a laser recording material 74. The secondary substrate 72 is adhered to the primary substrate 70 by means of an adhesive or sticky substance, similar to dry adhesives found on tape. The laser recording material may be any of the materials previously discussed, such as DREXON material, except that the secondary substrate 72 is substituted for the substrate previously mentioned. A protective coating 76 is applied over the laser recording material. Using this embodiment, photographs of the prior art may be converted to the optical data and image medium of the present invention. In this situation, not shown in the drawing of FIG. 7, a portion of an image area is converted to a non-image area by application of the sticky laser recording material. The laser recording material rests above developed silver-halide emulsion, resembling FIG. 6, except that the emulsion is completely exposed and developed in the region underlying the secondary substrate.

In all of these embodiments, a strip of laser recording material is positioned adjacent one or more visual images for providing archival data storage of a similar quality for data as for the photo image. Remarks in the form of alphanumerics, voice or digitized pictures or signature may be laser recorded adjacent to the photographic image. By this means these two forms of communication will not be separated. Information about the person is complimentary to the photo image on the card. For example, transaction information related to a person may be recorded on the card. Such transaction information could be banking information, such as a record of deposits and withdrawals. In former years, such transactions were recorded in a passbook, but because of the amount of time taken for sequential entries in a passbook and because of automation, passbook banking was abandoned, even though it was more favorable to consumers. Now, sequential transactions may be recorded automatically so that a consumer may once again have a complete record of prior transactions, although a card reader is necessary. The visual image on the card provides for security and guards agaisnt fraudulent transactions. Insurance transactions, immigration matters and the like all involve sequential transactions involving personal data. While it is important to record the transaction, it is also important to relate the transaction to eyereadable personal data so that a human judgment may be formed. For this purpose, a visual image of a face or a fingerprint assists in forming a human judgment relating to the validity of the transaction.

Figure 8:
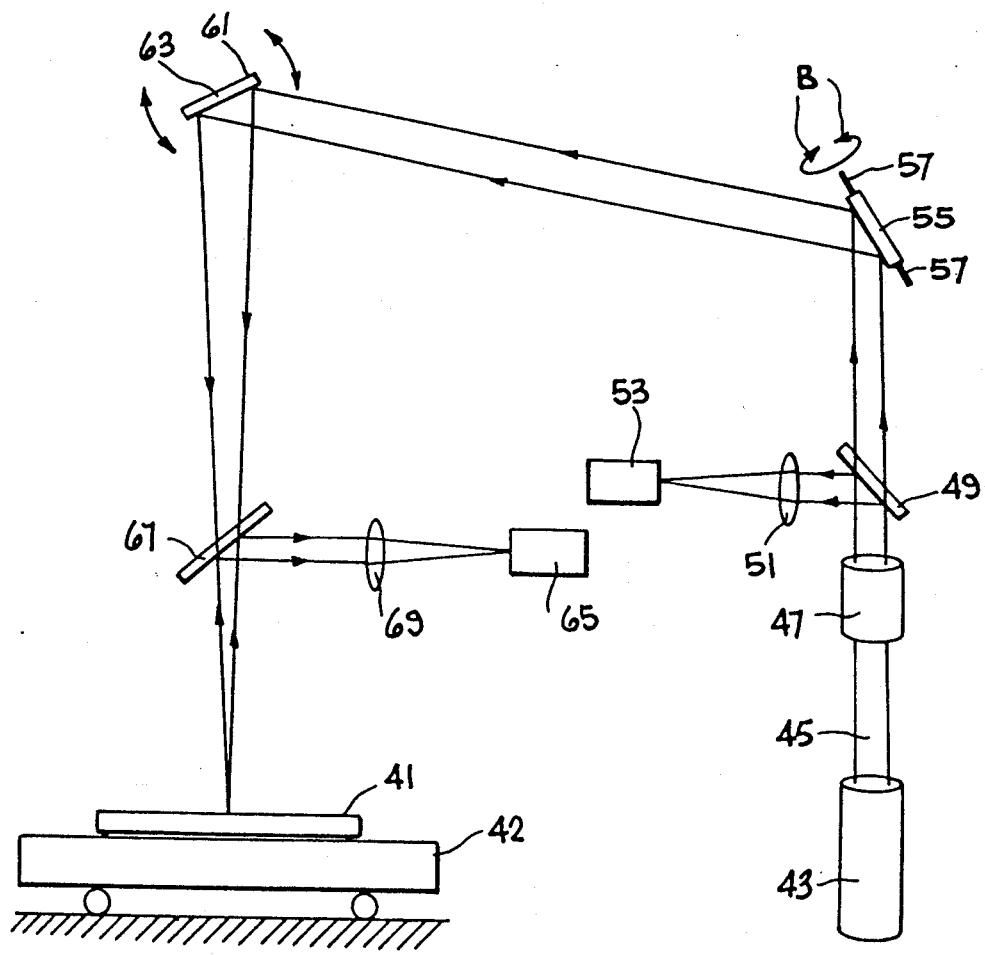
FIG. 8 is a plan view of optical apparatus for reading and writing on the data strip portion of the medium illustrated in FIG. 1.

Of course, while the photo images may be read by conventional means, low-powered laser or a photodetector array apparatus must be used to read the data strip. A laser apparatus is illustrated in FIG. 8, which illustrates the side view of the lengthwise dimension of the medium of FIG. 1 consisting of a data strip in combination with photo images on a card. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and forusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor adjusted by a closed loop position servo system of the type used in magnetic disk drives. Reference position information may be prerecorded on the card so that position error signals may be generated and used as feedback in motor control. Upon reading one data path, the mirror 55 is slightly rotated. The motor moves holder 42 lengthwise so that the path can be read again, and so on. As light is scattered and reflected from spots in the laser recording material, the reflectivity of the beam changes relative to surrounding material where no spots exist. The beam should deliver sufficient laser energy to the surface of the recording material to create spots in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a spot and surrounding material are detected by light detector 65 which may be a photodiode. Light is focused onto detector 65 by beam splitter 67 and focusing lens 69. Servo motors, not shown, control the positions of the mirrors and drive the motors in accord with instructions received from control circuits, as well as from feedback devices. The detector 65 produces electrical signals corresponding to pits. Other optics, not shown, could be used to observe the photo images, while data is being read or written on the data strip.

A photodetector array such as a CCD could also be used. It could be either a linear array or area array. The number of detector elements per track would be approximately three elements to create a reading redundancy. The surface would be eliminated with low-cost light-emitting diodes generating power primarily in the near infra-red to match the sensitivity spectrum of the photodetector array.

What is claimed is:

1. A system for recording and reading personal information with a laser comprising,
    a wallet size card having a major surface with personal, eye readable information relating to a user thereon, said eye readable information disposed in photographic media, the card surface having laser recording material thereon capable of in situ laser recording of information relating to said user thereon, the recording material adapted for laser recording of data, the laser recorded information being written in a permanent manner onto the recording material,
    laser means having a beam disposed in laser writing relation with respect to said laser recording material for writing data thereon, said data being represented by spots in the recording material and having a dimension of between 5 microns and 25 microns,
    a light detector means disposed in reading relation with respect to said recording material for reading said data, and
    means providing relative motion between the beam and the card for reading and writing said data on the card.

2. A system for recording and reading personal information with a laser comprising,
    a card holder means for supporting a data card having an optical recording surface with laser readable data aligned in data paths,
    a laser beam means for illuminating the data paths,
    detector means disposed in reading relation to the data paths,
    a laser recording means disposed in writing relation to the recording surface such that as data is written the data is aligned in paths with existing data paths, said data being represented by spots in the recording surface having a dimension of between 5 microns and 25 microns, said data being written in a permanent manner;
    means for moving the card holder means along a line, and
    image bearing means disposed on said card surface for displaying eye readable information relating to a person thereon, said eye-readable information disposed in photographic media.

3. The system of claim 2 wherein said eye readable information is a face photograph and said laser readable information is security information related to the person of said face photograph.

4. The system of claim 2 wherein said eye readable information is a fingerprint and said laser readable information is security information related to the person of said fingerprint.

5. The system of claim 2 wherein said eye readable information is a face photograph and said laser readable information is insurance information associated with the person of which the face photograph was taken.

6. The system of claim 2 wherein said eye readable information is a fingerprint and said laser readable information is insurance information associated with the person of which the fingerprint was recorded.

7. The system of claim 2 wherein said eye readable information is a face photograph and said laser readable information is medical information associated with the person of which the face photograph was taken.

8. The system of claim 2 wherein said eye readable information is a fingerprint and said laser readable information is medical information associated with the person of which the fingerprint was recorded.

9. The system of claim 2 wherein said eye readable information is a face photograph and said laser readable information is banking information associated with the person of which the face photograph was taken.

10. The system of claim 2 wherein said eye readable information is a fingerprint and said laser readable information is banking information associated with the person of which the fingerprint was recorded.

11. The system of claim 2 wherein the laser readable data is associated with the person of which the eye readable information relates.

* * * * *